C. L. SCHWARZ.
WHEEL TIRE.
APPLICATION FILED JAN. 29, 1912.
1,074,899.
Patented Oct. 7, 1913.
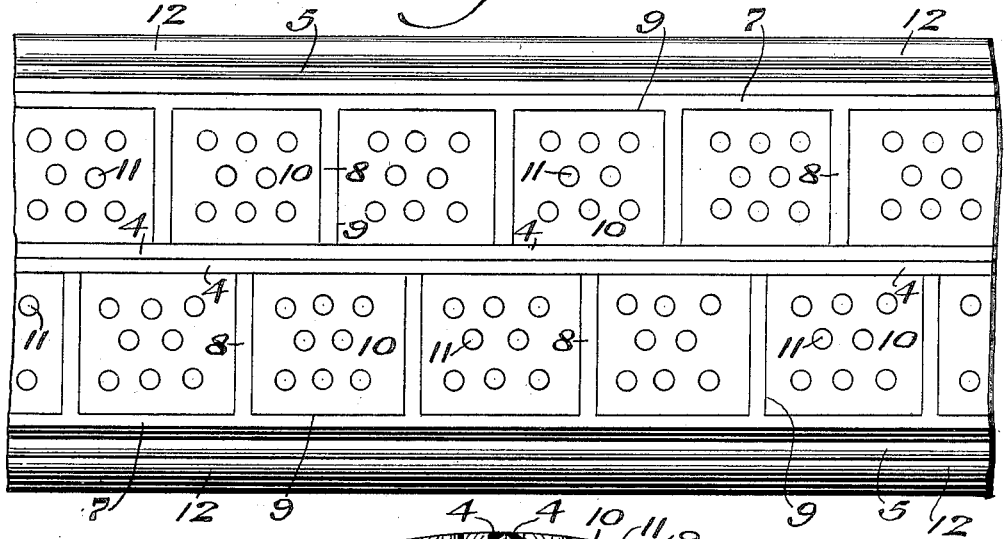
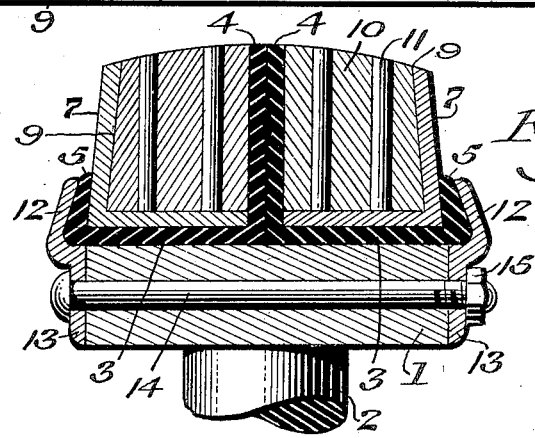
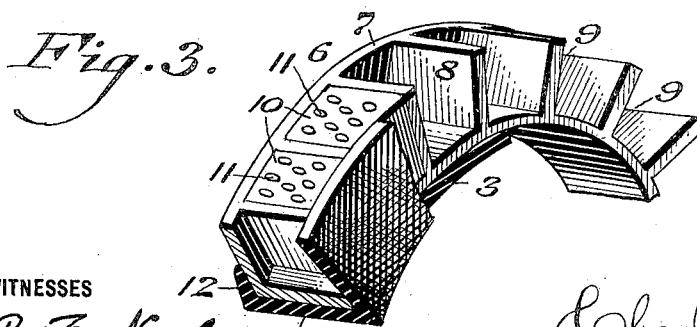

UNITED STATES PATENT OFFICE.

CHARLES LOUIS SCHWARZ, OF PHILADELPHIA, PENNSYLVANIA.

WHEEL-TIRE.

1,074,899.

Specification of Letters Patent.   Patented Oct. 7, 1913.

Application filed January 29, 1912. Serial No. 674,013.

*To all whom it may concern:*

Be it known that I, CHARLES L. SCHWARZ, a citizen of the United States, residing in the city and county of Philadelphia, State of Pennsylvania, have invented a new and useful Wheel-Tire, of which the following is a specification.

My invention relates to a new and useful tire for vehicle wheels and consists of a plurality of compartments each adapted to receive a core, and in providing resilient bearings or supports for said compartments.

It further consists in providing a resilient or yielding bearing between the sections or compartments and the rim, and in novel means for connecting the same to the rim.

It further consists of other novel features of construction all as will be hereinafter fully set forth.

The invention is satisfactorily illustrated in the accompanying drawings, but the various instrumentalities thereof may be varied, and so it is to be understood that the invention is not limited to the specific arrangement and organization shown and described.

Figure 1 represents a plan view of a portion of the rim and tire. Fig. 2 represents a transverse section of the wheel rim provided with my improved tire. Fig. 3 represents a perspective view of a portion of the detached tire.

Similar numerals of reference indicate corresponding parts in the figures.

Referring to the drawings:—1 designates the rim or felly of a wheel of any suitable or desired construction, and 2 indicates a portion of a spoke which is connected therewith, and of which there may be any desired number. The tire is composed of two annular yielding members, which are formed with a bottom 3, and adapted to rest upon the rim 1 and with sides 4, which, as seen from Fig. 2, are adapted to abut. Each annular yielding member is provided with a flange or outer side member 5. Seated upon and carried by the bottom 3 of the annular yielding members are annular members 6, preferably formed of metal, having outer sides 7 and partitions 8, at suitable intervals therearound, forming compartments 9, one side of which is open, and said annular member 6 are situated so that the open sides of the compartment thereof are closed by the side members 4 of the annular yielding members.

Seated within each compartment is a block or core 10, preferably made of wood, fiber or similar material, and I preferably desire to make the outer walls 7 of the annular members suitably converging on radial lines to the circle of the wheel, and to have the outer face of each of the blocks or cores to correspond, so that the said blocks will be firmly and positively held within the compartments.

I may, if desired, provide metallic pins 11, in the wooden blocks, and preferably situated in a radial direction to have their peripheral ends exposed. The outer walls of the flanges 5 are also preferably converging or inclined, in order to be engaged by flanges 12 on annular rings, 13, which are adapted to be fastened to the rim 1, in any suitable manner, as by bolts 14 and nuts 15, in order that the parts will be firmly and positively held in position.

It will be noted that the annular yielding members close the open inner sides of the annular members, and compartments of the annular members, and that the inner sides of the cores therein abut said yielding members so that there is a separation of the cores and of the annular members of the cores is provided, while movement of the cores is provided, while radial movement is provided by the cushioning action of the annular yielding members which resiliently carry or support the annular members, the effect of all of which is evident. By this means it will be seen that the various parts may be quickly and easily assembled and removed for any purpose, while the wooden blocks, which form the cores, having their sides exposed at the periphery of the tire form a surface which is not as liable to slip, as a complete metallic tire.

Having thus described my invention, what I claim as new and desire to secure by Letters Patent, is:—

1. A wheel tire composed of two annular members formed with a plurality of compartments each having an open inner side, an annular yielding member between said annular members, cores seated within said compartments and having their inner sides abutting said annular yielding member and laterally movable against said yielding member, and means for locking the parts to the wheel.

2. A wheel tire comprising two series of compartments, each of the latter having an open inner side, cores seated within said compartments, and a yielding member between the said series of compartments and closing the open inner sides thereof with the inner sides of said cores abutting said yielding member and laterally movable against said yielding member.

3. A wheel tire composed of two annular members formed with a plurality of compartments, yielding members between and supporting said annular members extending circumferentially around the wheel, cores seated within said compartments, and means for locking the parts to the wheel.

CHARLES LOUIS SCHWARZ.

Witnesses:
WM. CANER WIEDERSEIM,
C. D. McVAY.

Copies of this patent may be obtained for five cents each, by addressing the "Commissioner of Patents, Washington, D. C."